United States Patent
Abbott et al.

(10) Patent No.: US 12,031,216 B2
(45) Date of Patent: Jul. 9, 2024

(54) EMBEDDED FOUNDATION PROTECTION SYSTEM

(71) Applicant: COPPER CARE WOOD PRESERVATIVES, INC., Humphrey, NE (US)

(72) Inventors: William Abbott, Humphrey, NE (US); Benjamin Abbott, Humphrey, NE (US)

(*) Notice: Subject to any disclaimer, the term of this patent is extended or adjusted under 35 U.S.C. 154(b) by 835 days.

(21) Appl. No.: 16/979,808

(22) PCT Filed: Mar. 21, 2019

(86) PCT No.: PCT/AU2019/050248
§ 371 (c)(1),
(2) Date: Sep. 10, 2020

(87) PCT Pub. No.: WO2019/183667
PCT Pub. Date: Oct. 3, 2019

(65) Prior Publication Data
US 2021/0040624 A1    Feb. 11, 2021

(30) Foreign Application Priority Data
Mar. 28, 2018   (AU) .................. 2018901022

(51) Int. Cl.
*C23F 13/14*       (2006.01)
*B32B 3/08*        (2006.01)
(Continued)

(52) U.S. Cl.
CPC ............ *C23F 13/14* (2013.01); *B32B 3/08* (2013.01); *B32B 5/022* (2013.01); *B32B 15/09* (2013.01);
(Continued)

(58) Field of Classification Search
CPC ................................. C04B 2111/265
See application file for complete search history.

(56) References Cited

U.S. PATENT DOCUMENTS

| 4,731,267 A | 3/1988 | Makus et al. |
| 7,195,823 B2 | 3/2007 | Sanders et al. |
| 2014/0027306 A1* | 1/2014 | Whitmore ............... C23F 13/18 205/734 |

FOREIGN PATENT DOCUMENTS

| CN | 101275391 A | * 10/2008 |
| CN | 101275391 A | 10/2008 |

(Continued)

OTHER PUBLICATIONS

International Search Report dated Jun. 4, 2019 from PCT Application No. PCT/AU2019/050248.

*Primary Examiner* — Alexander W Keeling
(74) *Attorney, Agent, or Firm* — INNOVATION CAPITAL LAW GROUP, LLP; Vic Lin

(57) ABSTRACT

A passive cathodic protection process for preservation of embedded metallic foundations entails embedding a wrap around a metallic foundation. The wrap has an outer sheath and an inner absorbent mat to be in direct contact with the metallic foundation. The is also mat hydrophobic. The wrap is subsumed such that an upper edge of the wrap is accessible. An oil-based metallic soap is injected via the upper edge to impregnate the mat. The metallic soap is selected from a set of metallic soaps such that the metal of the metallic soap is more electropositive than the metal of the metallic foundation such that the metallic soap acts as an anodic solution for galvanic exchange with metal within the embedded metallic foundation for the passive cathodic protection thereof. For example, zinc naphthenate may be selected for steel or aluminium foundations thereby allowing for both passive cathodic protection and biocidal action.

18 Claims, 3 Drawing Sheets

(51) Int. Cl.
*B32B 5/02* (2006.01)
*B32B 15/09* (2006.01)
*B32B 15/20* (2006.01)

(52) U.S. Cl.
CPC ........ *B32B 15/20* (2013.01); *B32B 2260/021* (2013.01); *B32B 2260/04* (2013.01); *B32B 2262/0253* (2013.01); *B32B 2305/20* (2013.01); *B32B 2307/714* (2013.01); *B32B 2307/73* (2013.01); *B32B 2307/732* (2013.01); *B32B 2419/00* (2013.01); *C23F 2201/02* (2013.01)

(56) References Cited

FOREIGN PATENT DOCUMENTS

| | | | |
|---|---|---|---|
| CN | 209552612 U | * | 10/2019 |
| FR | 2397924 A1 | | 2/1979 |
| WO | 20170914868 A1 | | 6/2017 |

* cited by examiner

EMBEDDED FOUNDATION PROTECTION SYSTEM

FIELD OF THE INVENTION

This invention relates generally to embedded wraps for preservation of structure foundations such as utility poles and the like.

This application is related to co-pending PCT patent application entitled "A chemical applicator system for replenishment of embedded foundation preservation wraps" by the present Applicant, the entire contents of which are herein incorporated by reference.

BACKGROUND OF THE INVENTION

Copper naphthenate has been commercially produced and industry utilized as wood preservative since its first use in Europe in 1889. Copper naphthenate is typically formulated in hydrocarbon solvents such as diesel, heavier fuel oils, or mineral spirits. Copper naphthenate in oil is a heavy duty wood preservative used utility poles, railroad crossties and bridge timbers, highway construction such as posts and guardrails, fence posts, and piles.

Unlike creosote, pentachlorophenol, and arsenic-containing preservatives, copper naphthenate has been classified by the US EPA as a general use pesticide due to its relatively benign toxicity profile.

Copper naphthenate may impregnate a "bandage wrap" which is subsumed around a wooden foundation for the preservation thereof.

For example, FR 2397924 A1 (EBENSEER SOLVAY WERKE SOLVAY CIE) 16 Feb. 1979 [hereinafter referred to as D1] discloses a bandage wrap of absorbent material buried around a buried wooden post having an opening above ground for replenishment of the absorbent material with liquid wood preservative.

U.S. Pat. No. 4,731,267 A (MAKUS et al.) 15 Mar. 1988 [hereinafter referred to as D2] further discloses a buried bandage wrap for wood preservative treatment of wooden poles comprising copper naphthenate.

However, utility poles may be metallic such as of steel and preservation thereof is also desirous. Furthermore, foundations may comprise both metal and organic material, such as concrete foundations comprising steel reinforcement and an admixture of organic material.

Whereas copper naphthenate is a commonly used liquid preservative for wooden foundation protection, prior art bandage wrap systems are deficient for protection of metal foundations, such as steel or iron (or even aluminium) utility poles and/or reinforced concrete.

A need therefore exists for a way to protect most or all types of commercially installed wooden and metallic foundations.

It is to be understood that, if any prior art information is referred to herein, such reference does not constitute an admission that the information forms part of the common general knowledge in the art, in Australia or any other country.

SUMMARY OF THE DISCLOSURE

There is provided herein an embedded foundation protection system and process which comprises a bandage wrap subsumed around a foundation. The wrap comprises an outer protective sheath and an inner absorbent and hydrophobic mat, such as of polypropylene.

The wrap may be buried such that an upper edge of the wrap is accessible for periodic injection of liquid preservative replenishment including by way of apparatus as is disclosed in co-pending patent application entitled "A chemical applicator system for replenishment of embedded foundation preservation wraps" by the present applicant, the entire contents of which are herein incorporated by reference.

We found that whereas copper naphthenate is a commonly used liquid preservative for wooden foundation protection, prior art subsumed bandage wrap systems are deficient for protection of metallic foundations, such as steel/iron utility poles and/or reinforced concrete.

In this regard, we discovered that metallic soaps, when applied to a subsumed bandage wrap seem to protect metallic foundations. Our experimentation involved burying a ferrous metal pole surrounded by a wrap impregnated with a metallic soap and comparing corrosion thereof against a control ferrous metal pole after some time. The results of our experimentation showed that the ferrous metal pole surrounded by a wrap impregnated with a metallic soap showed significantly less corrosion than that of the second control metal pole.

Indeed, corrosion protection of the first pole appeared to extend far above the position of the wrap, leading us to suspect that the metallic soap causes a galvanic exchange to occur with the metal contained within the foundation, providing for the passive cathodic protection thereof, an effect that has hitherto been unexploited by prior art embedded foundation protection systems.

As such, we devised a method for protection of embedded foundations wherein the hydrophobic mat of the wrap is impregnated with an oil-borne metallic soap and wherein the metal of the metallic soap is more electropositive than that of the metal of the foundation.

The oil-borne metallic soap is readily absorbed by the hydrophobic mat, typically of polypropylene, and is applied specifically to act as an anodic solution for galvanic exchange with the more electronegative metal within the embedded metallic foundation for the passive cathodic protection thereof.

Preferably the metallic soap is a metal naphthenate, thereby having dual use biocidal and passive cathodic protection applicability.

We chose a metal naphthenate having a metal being more electropositive than that of the metal of the foundation being protected.

For example, we found zinc naphthenate or aluminium naphthenate as being suitable for cathodic protection of more electronegative steel foundations. Furthermore, we found that zinc naphthenate may even be used for the preservation of more electronegative aluminium foundations.

The metal naphthenate may be used alternatively for the preservation of wooden foundations or wooden foundations comprising both metal and organic content, such as reinforced concrete foundations comprising steel reinforcement and organic material admixture.

Whereas zinc naphthenate may have less biocidal potency as that of more commonly used copper naphthenate, such deficiency may be mitigated somewhat by the oligodynamic effect of the zinc molecules therein.

The galvanic protection by oil-borne metal soaps, such as oil-borne metal naphthenates, is surprising because oil-borne metal soaps are non-conductive, but conventional zinc galvanizing however depends on conductivity.

Specifically, the molecular bond between the steel and zinc for example must be conductive to allow the zinc anode to function. When a steel object is hot-dipped in zinc, the steel is both protectively coated and potentially benefited with passive cathodic protection.

However, when a steel/metallic foundation is covered with a wrap charged with an oil-borne metal soap, the wrap functions more like a non-conductive coating in that the non-conductive oil-borne metal soap functions as an insulator as opposed to an electrolyte. However, we suspect that the zinc molecules in the fluid, non-conductive and amorphous metal soap appear to be available for ionic exchange, thus providing a significant, albeit temporary, anode in solution.

As such, whereas insulators prevent corrosion by preventing ionic exchange and anodes prevent corrosion by facilitating sacrificial ionic exchange, the present liquid oil-borne non-conductive metal soap appears to simultaneously provide both types of metal corrosion protection, albeit with the limitation of having to be periodically recharged.

Conventional wrap systems, such as of D1 and D2 above employee copper naphthenate which would not exhibit such passive cathodic protection by the greater electronegativity of copper as compared to steel, for example, evident of the prior art failing to recognise or exploit the additional protective benefit of using a metal naphthenate having a metal being more electropositive than that of the metal of the foundation to be protected, even allowing for the protection of relatively electropositive metal foundations such as of aluminium.

The biocidal properties of the metal naphthenate (assisted by the oligodynamic effect thereof) and the organophilic properties of the polypropylene mat allow the present wrap to be additionally used for the protection of wooden foundations including foundations comprising both organic material and metal, such as reinforced concrete often mixed with organic fibres.

Furthermore, whereas organisms exist that can feed on plastic hydrocarbon molecules and therefore degrade the plastic protective layer of the wrap necessitating periodic replacement thereof, the the oligodynamic effect of zinc of zinc naphthenate for example may prevent or reduce such deterioration to such an extent that the service life of the present wrap may outlast that of the foundation it protects.

In embodiments, the protective sheath may comprise a copper foil laminate to further protect the sheath by oligodynamic effect from such plastic hydrocarbon digesting organisms. Whereas, oligodynamic effect is typically recognised and utilising the medical industry for sanitisation application, oligodynamic effect appears to be hitherto unrecognised and unexploited for enhancing durability of embedded foundation wraps, as is evident by the prior art only exploiting aluminium foil laminates for vapour barrier effect and for which aluminium is a poor choice for oligodynamic effect.

As such, the present system and process allows for an embedded foundation wrap which may protect wooden or metallic foundations or simultaneously protect foundations comprising metal and organic content. The system and process may even protect metallic foundations comprising relatively electropositive metal such as aluminium and the way in which the wrap can be replenished via the upper edge thereof and the oligodynamic effect provided by the use of the zinc naphthenate which may be enhanced by a copper foil laminate may allow the service life of the present wrap to outlast that of the foundation it protects.

It should be noted that whereas U.S. Pat. No. 7,195,823 B2 (SANDERS et al.) 27 Mar. 2007 [hereinafter referred to as D3], (in the unrelated field of joint protection as opposed to embedded foundation protection systems), discloses a porous pad designed to be placed within a joint between members made of wood, metal or combinations thereof for protection against biotic or abiotic deterioration within the joint and that D3 further discloses the porous pad being impregnated with a protective substance that is either a wood preservative or a metal corrosion inhibitor, D3 however fails to recognise the use of a metallic soap for passive cathodic protection, let alone for embedded foundation application.

Specifically, according to D3, the extent of the protection of the metal corrosion inhibitor according to D3 is for oxidation inhibition. Furthermore, whereas D3 discloses listings of various chemicals, including zinc naphthenate, D3 rather discloses these as being useful for their well-known fungicidal or insecticidal properties. D3 fails to disclose or obviously suggest the surprising galvanic protection effects of a using a metal naphthenate have a metal being more electropositive than that of the metal foundation it protects.

As such, the prior art fails to disclose or obviously suggest a passive cathodic protection process for embedded metallic foundations wherein a subsumed bandage wrap is impregnated with an oil borne metallic soap such as a metal naphthenate and wherein the metal of the metallic soap is specifically chosen to be more electropositive than that of the metal of the foundation it protects to cause galvanic exchange to occur for the passive cathodic protection of the metal and which also has biocidal effect for wooden foundation protection or foundations comprising both metal and organic content.

Furthermore, whereas subsumed bandage wrap foundation protection systems have hitherto used aluminium laminated, such are for vapour barrier effect which, in combination with plastic laminates are used to prevent the treated wood preservatives from migrating to the soil, rather than for oligodynamic effect for the preservation of plastic laminates against plastic hydrocarbon dissolving organisms for which aluminium would be a poor choice. Indeed, bandage wrap manufacturers (such as Baecker™) have rather hitherto included organic pesticides within plastic laminates for preservation of plastic laminates against such organisms.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
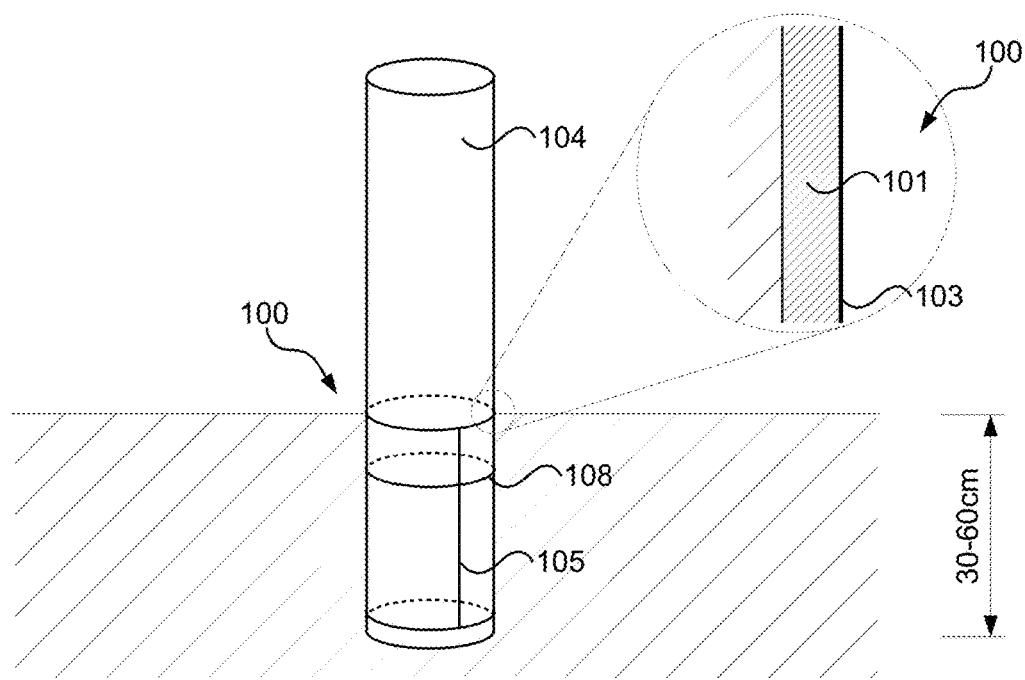
FIG. 1 shows an installed wrap for the preservation of a structure foundation.

FIG. 1 shows a wrap 100 subsumed around a foundation of a structure 104, such as a utility pole.

The wrap 100 comprises a hydrophobic mat 101, preferably of polypropylene. The mat 101 is further preferably polypropylene fibre and yet further preferably unwoven fibre.

The wrap 100 has a protective sheath 103 which may comprise plastic sheeting. The plastic sheeting may comprise polyethylene.

The hydrophobic mat 101 is impregnated with preservative for the preservation of the foundation of the structure 104.

The wrap 100 may be subsumed within the ground surrounding the structure 104 such that an upper edge thereof is accessible for replenishment such that the wrap 100 may remain subsumed, typically enduring the service life of the structure 104.

Figure 2:
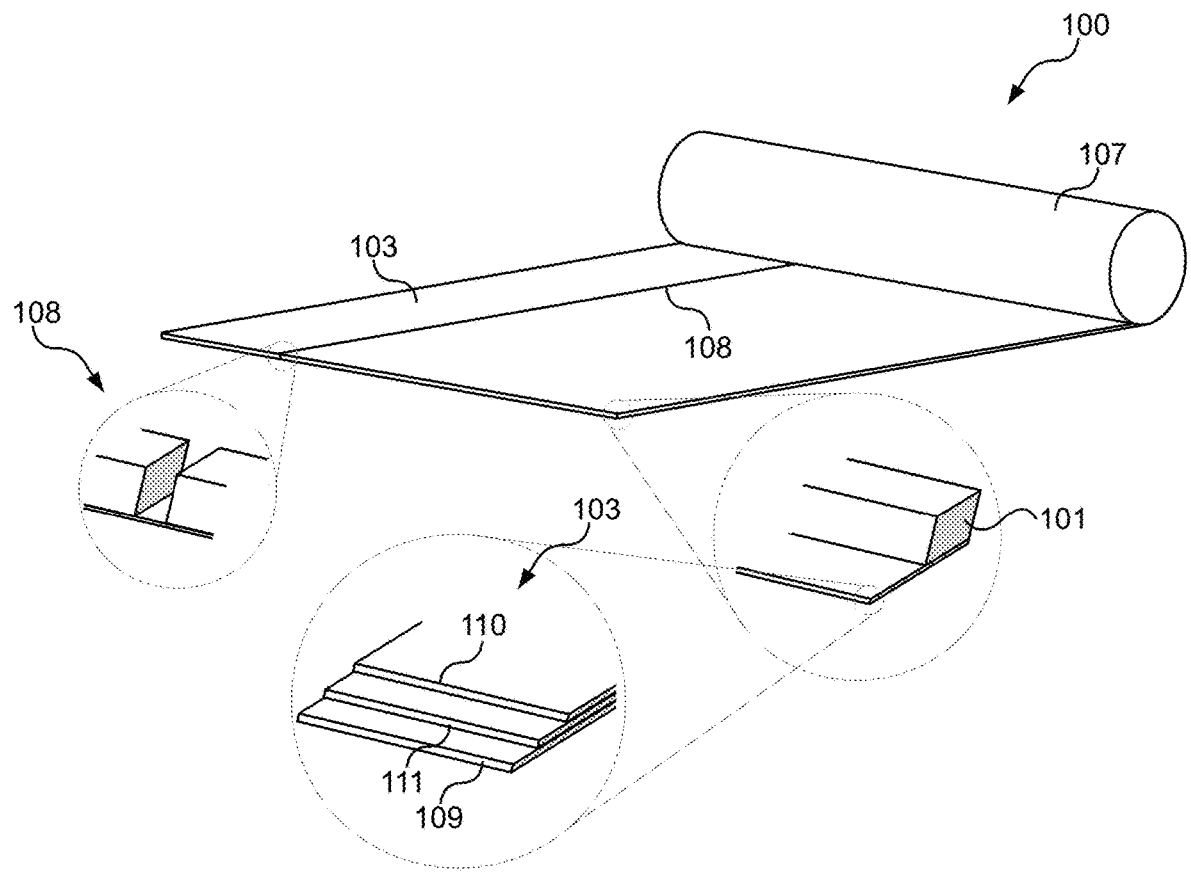
FIG. 2 shows a wrap supply sheet roll in accordance with an embodiment.

FIG. 2 shows an embodiment wherein the wrap 101 is formed from a continuous roll of sheet 105 which is cut to a length according to the diameter of the structure 104. With reference to FIG. 1, the edges of a cut sheet portion may be sealed with tape 105 or similar in a cylindrical fashion to surround the foundation such that the mat 103 directly contact the foundation for exposure to preservative.

In embodiments, the hydrophobic mat 103 may comprise a longitudinal narrowing 108 which locates towards the apparatus of the wrap 100 when installed. The longitudinal narrowing 108 encourages the preservative to dwell at the upper portion of the wrap 100, thereby enhancing the coverage of the reserved of along the length of the foundation.

With reference to FIG. 2, the protective sheath 103 may comprise plastic sheets of polyethylene or Polyethylene terephthalate (PETE). In the embodiment shown, the sheath 103 may comprise an outer plastic sheet 109 and a metal foil laminate 111, such as of copper for enhanced oligodynamic effect to preserve the plastic sheet 109. The metal foil laminate 111 may further offer vapour barrier effect to prevent the preservative from migrating to the surrounds. An inner plastic sheet 110 may be provided also, cooperating with the outer plastic sheet 119 to laminate the metal foil laminate 111 therebetween.

Figure 5:
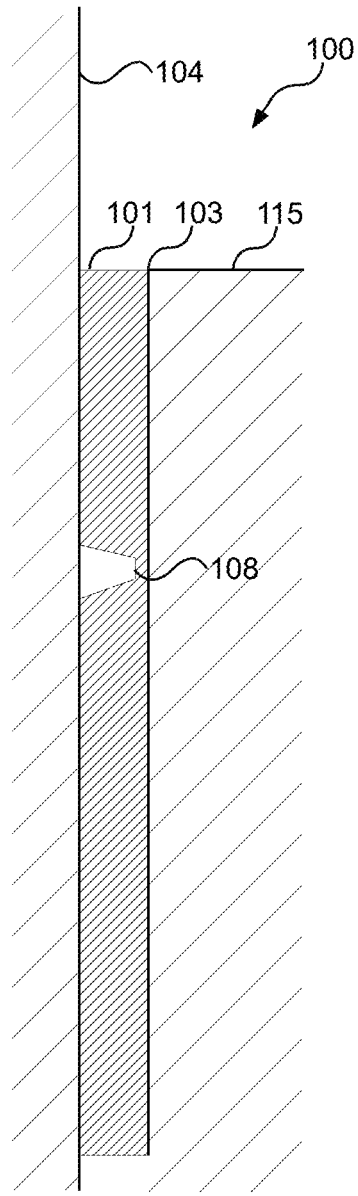
FIG. 5 shows a cross-sectional elevation view of the installed wrap in accordance with an embodiment.

FIG. 5 illustrates the wrap 100 installed between the foundation of the structure 104 and the ground 105. There is shown the outer protective sheath 103 enclosing the hydrophobic mat 101 therein in direct contact against the foundation. There is also shown the longitudinal narrowing 108 located towards an upper edge of the wrap 100.

Figures 4A, 4B:
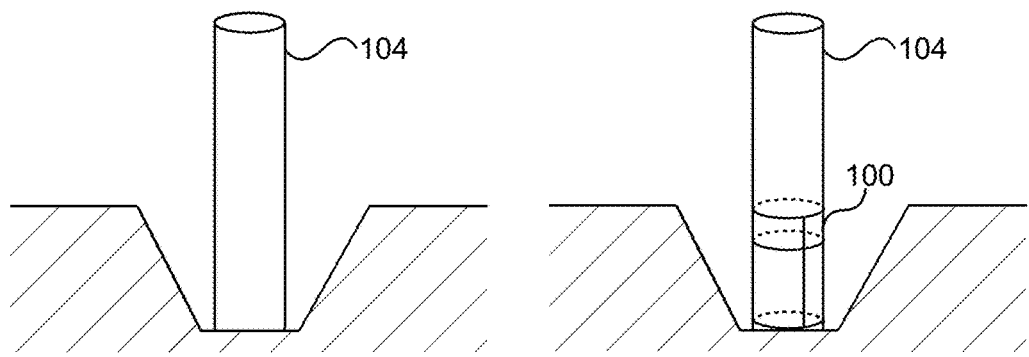
FIGS. 4A-4D illustrates the installation and replenishment of the wrap in accordance with an embodiment.
Figure 6:
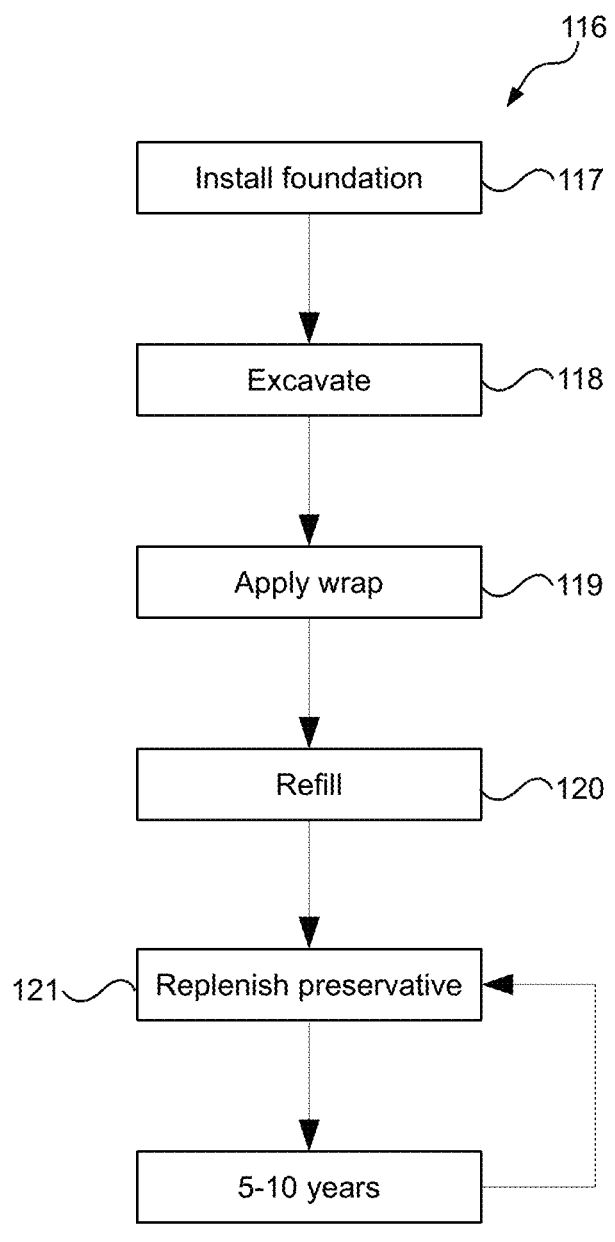
FIG. 6 illustrates a process for the preservation of embedded foundations in accordance with an embodiment.

FIG. 6 illustrates the installation and use of the wrap which, with reference to FIGS. 4A-4D comprises the step of the installation of the foundation at step 117 and the excavation around the foundation 118 as is illustrated in FIG. 4A.

Step 119 comprises wrapping the wrap 100 around the foundation and sealing the edges thereof as illustrated in FIG. 4B. The wrap 100 is preferably installed un-impregnated with preservative, thereby preventing handling contact therewith. Once installed, the mat 101 may be soaked with preservative.

Figures 4C, 4D:
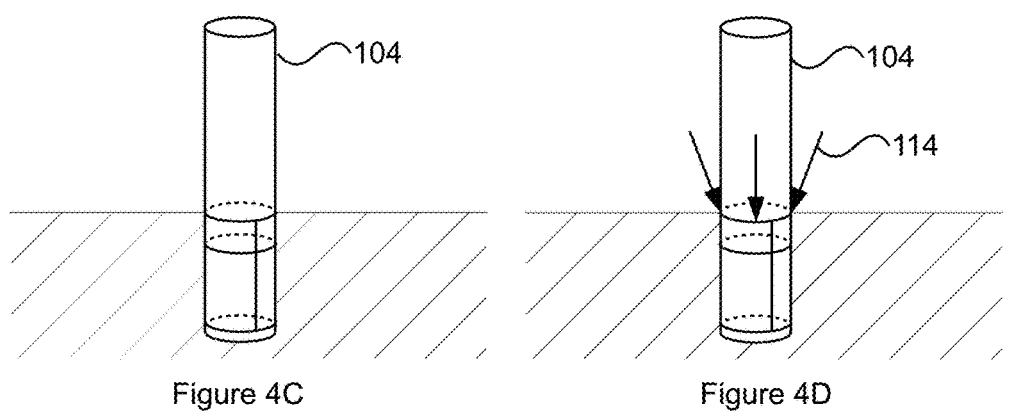

Step 120 comprises refilling the excavation, thereby embedding the foundation of the structure 104 with the wrap 100 subsumed therearound as illustrated in FIG. 4C.

The wrap 100 is located such that an upper edge thereof is accessible such that, at step 121, the preservative 114 can be periodically replenished, such as every 5-10 years such that the wrap 100 can be left in place. In embodiments, the preservative 114 may be replenished using an applicator as is disclosed in co-pending patent entitled "A chemical applicator system for replenishment of embedded foundation preservation wraps" by the present Applicant, the entire contents of which are incorporated herein by reference.

The foundation of the structure 104 may comprise metal. In this regard, the structure 104 may be entirely metallic such as by being a steel or aluminium utility pole or alternatively comprise metal, such as a steel reinforced concrete structure.

For the preservation of the metallic structure 104, an oil based metallic soap may be used. By being oil base, the preservative is readily absorbed by the hydrophobic mat 101 and which further repels corrosion causing water electrolyte.

The metal of the metallic soap is chosen to be more electropositive than the metal of the foundation to be protected. As such, the metallic soap acts as an anodic solution for galvanic exchange the metal of the embedded metallic foundation for the passive cathodic protection thereof.

Where the foundation comprises steel, a zinc or aluminium metal soap may be employed for being more electropositive than steel. Where the foundation comprises aluminium, the metal soap may comprise zinc, being more electropositive than aluminium.

Figure 3:
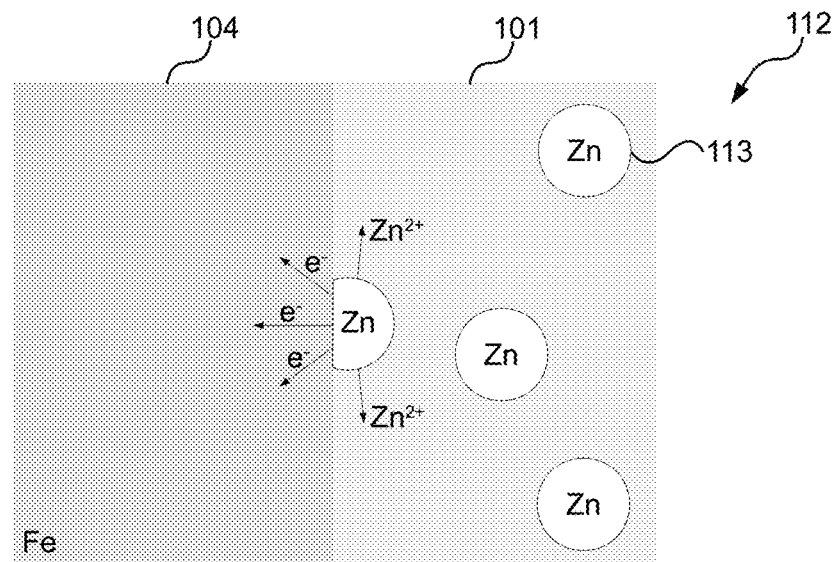
FIG. 3 illustrates galvanic exchange occurring between the wrap and a metallic foundation in accordance with an embodiment.

FIG. 3 illustrates the galvanic exchange for the passive cathodic protection of a metallic foundation comprising iron/steel. In this embodiment, the metallic soap comprises zinc and there is shown zinc molecules 113 in oil suspension in the mat 101.

As each zinc molecule contacts the iron, electrons are donated thereto by virtue of zinc being more electropositive such that the link is sacrificed as $Zn^{2+}$, thereby preserving the iron foundation by passive cathodic protection.

For steel reinforced concrete foundations, the oil based metallic soap may seep someway through the concrete, thereby also preserving the internal steel reinforcement by passive cathodic protection.

In a preferred embodiment, the metallic soap is a metal naphthenate thereby conferring wood preservative, insecticidal, fungicidal and acaricidal properties such that the impregnated wrap 100 can be used alternatively for the preservation of wooden foundations such as of wooden telegraph poles or foundations comprising both metal and organic content, such as reinforced concrete comprising steel reinforcement and mixed with organic fibres.

As such, for the preservation of steel containing foundations, aluminium naphthenate or zinc naphthenate may be employed, both being more electropositive than steel for the passive cathodic protection thereof yet also conferring biocidal properties.

Whereas the biocidal toxicity of zinc naphthenate may be less than that of copper naphthenate for example, the zinc molecules of the zinc naphthenate may also offer oligodynamic effect. Furthermore, the protective outer sheath 103 may comprise the copper foil laminate 111 for enhanced oligodynamic effect, including for the preservation of the plastic of the outer protective sheet 103.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The invention claimed is:

1. A passive cathodic protection process for preservation of embedded metallic foundations, the process comprising: applying a wrap around an embedded metallic foundation, the wrap comprising an outer sheath and an inner absorbent mat to be in direct contact with the metallic foundation, the mat being hydrophobic, subsuming the embedded foundation and wrap such that an upper edge of the wrap is accessible, and injecting an oil-based metallic soap via the upper edge to impregnate the mat and wherein the metallic soap is selected from a set of metallic soaps such that the metal of the metallic soap is more electropositive than the metal of the metallic foundation such that the metallic soap acts as an anodic solution for galvanic exchange with metal within the embedded metallic foundation for the passive cathodic protection thereof.

2. The process as claimed in claim 1, wherein the metallic soap is a metal naphthenate.

3. The process as claimed in claim 2, wherein the metallic foundation comprises steel.

4. The process as claimed in claim 3, wherein the metallic soap comprises a metal naphthenate selected from the group of metal naphthenates comprising zinc naphthenate and aluminium naphthenate.

5. The process as claimed in claim 2, wherein the metallic foundation comprises aluminium.

6. The process as claimed in claim 5, wherein the metallic soap comprises zinc naphthenate.

7. The process as claimed in claim 1, wherein the absorbent mat comprises polypropylene.

8. The process as claimed in claim 7, wherein the absorbent mat comprises polypropylene fibre.

9. The process as claimed in claim 8, wherein the polypropylene fibre is unwoven.

10. The process as claimed in claim 1, wherein the sheath comprises plastic comprising at least one of polyethylene and PETE.

11. The process as claimed in claim 10, wherein the sheath comprises a copper foil laminate.

12. The process as claimed in claim 11, wherein the copper foil laminate is laminated between plastic sheets.

13. The process as claimed in claim 11, wherein the copper foil sheet is between 10-30 µm thick.

14. The process as claimed in claim 12, wherein the copper foil sheet is 18 µm thick.

15. The process as claimed in claim 1, wherein wrap is left in place for more than two years.

16. The process as claimed in claim 1, wherein wrap is left in place for more than five years.

17. The process as claimed in claim 1, wherein the process further comprises periodically injecting a replenishment of oil-based metallic soap via the upper edge.

18. The process as claimed in claim 17, wherein the replenishment is injected every 5-10 years.

* * * * *